United States Patent
Diamandis et al.

(10) Patent No.: US 9,965,693 B2
(45) Date of Patent: May 8, 2018

(54) MACHINE-READABLE FORM CONFIGURATION AND SYSTEM AND METHOD FOR INTERPRETING AT LEAST ONE USER MARK

(71) Applicant: Intralot S.A.—Integrated Lottery Systems and Services, Athens (GR)

(72) Inventors: Argiris Diamandis, Athens (GR); Aristodemos Pnevmatikakis, Porto-rafti (GR)

(73) Assignee: Intralot S.A.—Integrated Lottery Systems and Services, Athens (GR)

( * ) Notice: Subject to any disclaimer, the term of this patent is extended or adjusted under 35 U.S.C. 154(b) by 165 days.

(21) Appl. No.: 15/162,150

(22) Filed: May 23, 2016

(65) Prior Publication Data

US 2016/0267342 A1 Sep. 15, 2016

Related U.S. Application Data

(63) Continuation of application No. 14/072,389, filed on Nov. 5, 2013, now Pat. No. 9,349,064, which is a continuation of application No. 12/510,825, filed on Jul. 28, 2009, now Pat. No. 8,587,663.

(60) Provisional application No. 61/086,180, filed on Aug. 5, 2008.

(30) Foreign Application Priority Data

Aug. 4, 2008 (GR) .................................. 080100525

(51) Int. Cl.
*H04N 7/18* (2006.01)
*G06K 9/20* (2006.01)
*G06K 9/00* (2006.01)
*G09B 7/06* (2006.01)

(52) U.S. Cl.
CPC ........... *G06K 9/20* (2013.01); *G06K 9/00442* (2013.01); *G06K 9/2063* (2013.01); *H04N 7/18* (2013.01); *G09B 7/066* (2013.01)

(58) Field of Classification Search
None
See application file for complete search history.

(56) References Cited

U.S. PATENT DOCUMENTS

| | | | |
|---|---|---|---|
| 6,741,738 B2 * | 5/2004 | Taylor | G06K 17/0032 358/450 |
| 2003/0020889 A1 * | 1/2003 | Takahashi | G03F 7/70716 355/53 |
| 2005/0099446 A1 * | 5/2005 | Mizes | B41J 29/393 347/19 |

(Continued)

*Primary Examiner* — Andy Rao
*Assistant Examiner* — James Edwards
(74) *Attorney, Agent, or Firm* — Greenberg Traurig, LLP

(57) ABSTRACT

One embodiment of the present invention relates to a machine-readable form configuration (and associated method). Another embodiment of the present invention relates to a system for interpreting at least one user mark (and associated methods). In one example, a plurality of user marks may be interpreted. In another example, the machine-readable form may be a lottery play slip, survey, test, or the like. In another example, the system may interpret user mark(s) made on a lottery play slip, survey, test or the like. In another example, the system may interpret user mark(s) made on a paper or the like having non-planar distortion(s).

1 Claim, 14 Drawing Sheets

(56) References Cited

U.S. PATENT DOCUMENTS

2005/0226541 A1* 10/2005 McIntosh .......... G06K 17/0032
                                                    382/306
2009/0003729 A1*  1/2009 Metcalfe ............ H04N 1/00002
                                                    382/287

* cited by examiner

800

MACHINE-READABLE FORM CONFIGURATION AND SYSTEM AND METHOD FOR INTERPRETING AT LEAST ONE USER MARK

RELATED APPLICATIONS

This application is a continuation of U.S. patent application Ser. No. 14/072,389, which is a continuation of U.S. patent application Ser. No. 12/510,825, filed Jul. 28, 2009, which claims the benefit of U.S. Provisional Application Ser. No. 61/086,180, filed Aug. 5, 2008 and Greek Patent Application Serial No. 20080100525, filed Aug. 4, 2008, each of which are incorporated herein by reference in their entirety.

FIELD OF THE INVENTION

One embodiment of the present invention relates to a machine-readable form configuration (and associated method).

Another embodiment of the present invention relates to a system for interpreting at least one user mark (and associated methods).

In one example, a plurality of user marks may be interpreted.

In another example, the machine-readable form may be a lottery play slip, survey, test, or the like.

In another example, the system may interpret user mark(s) made on a lottery play slip, survey, test or the like.

In another example, the system may interpret user mark(s) made on a paper or the like having non-planar distortion(s).

For the purposes of describing and claiming the present invention, the term "lottery play slip" is intended to refer to the form upon which a user places marks to indicate desired selection(s).

Further, for the purposes of describing and claiming the present invention, the term "lottery ticket" is intended to refer to a receipt indicating the selection(s) made by a user.

Further, for the purposes of describing and claiming the present invention, the term "fiducial mark" is intended to refer to a mark defining a datum point or standard of positional reference used as a basis for calculation or measurement.

Further, for the purposes of describing and claiming the present invention, the term "user marking cell" is intended to refer to an area on a form intended to receive an indication of a desired selection by a user.

Further, for the purposes of describing and claiming the present invention, the term "scale invariant" is intended to refer to having one or more characteristics that will not change under different scales (or distances).

Further, for the purposes of describing and claiming the present invention, the term "image sensor" is intended to refer to that part of a camera which converts an optical image into an electrical signal.

Further, for the purposes of describing and claiming the present invention, the term "interpreting user marks" is intended to refer to identifying at least the presence and position of user marks.

Further, for the purposes of describing and claiming the present invention, the term "planar position" is intended to refer to the projection onto the image of the position of the center of an element of the form (e.g. fiducial mark, user marking cell), under the assumption that the form is planar.

BACKGROUND OF THE INVENTION

Forms intended for lottery games, surveys and the like have traditionally been read by page scanners, whose mechanical feeding mechanism also flattened the form with the help of rollers and springs before presenting the form to the scanning head. Subsequently, scanning was performed under controlled lighting conditions that disregard a set of colors, termed "blind colors" (e.g., red and its close hues). All the regions that are intended for user markings as well as any information not required to be machine-readable have typically been colored in these blind colors, so that there has been adequate guidance for the user's placement of marks, but the guides themselves remained essentially invisible to the scanning sensor. This eased the user mark detection process. Additional machine-readable indices may have been printed in machine-visible ink along a side of the form, separate from the area allocated to user markings, to help the inference of the possible marking areas (typically arranged in the form of a rectangular grid) by the machine. These machine-readable markings would traditionally allow compensation for the image shift and/or rotation encountered during the scanning process, but would not traditionally convey any other spatial information (e.g., scaling and/or position in the 3D space).

The traditional page scanner has complex and precise mechanical parts; hence its dimensions are typically dictated by the document size and mechanical complexity, increasing its overall size and manufacturing costs. Additionally, regular maintenance is typically needed, further increasing the ownership cost.

At least in part for these reasons, image sensors have been proposed for the task. Of note, image sensors have been known to be used in the art for reading barcode symbols, but these bar code applications operate under strict printing tolerances for machine printing and offer designed-in redundancy that facilitates reading by such a sensor.

Figure 1:
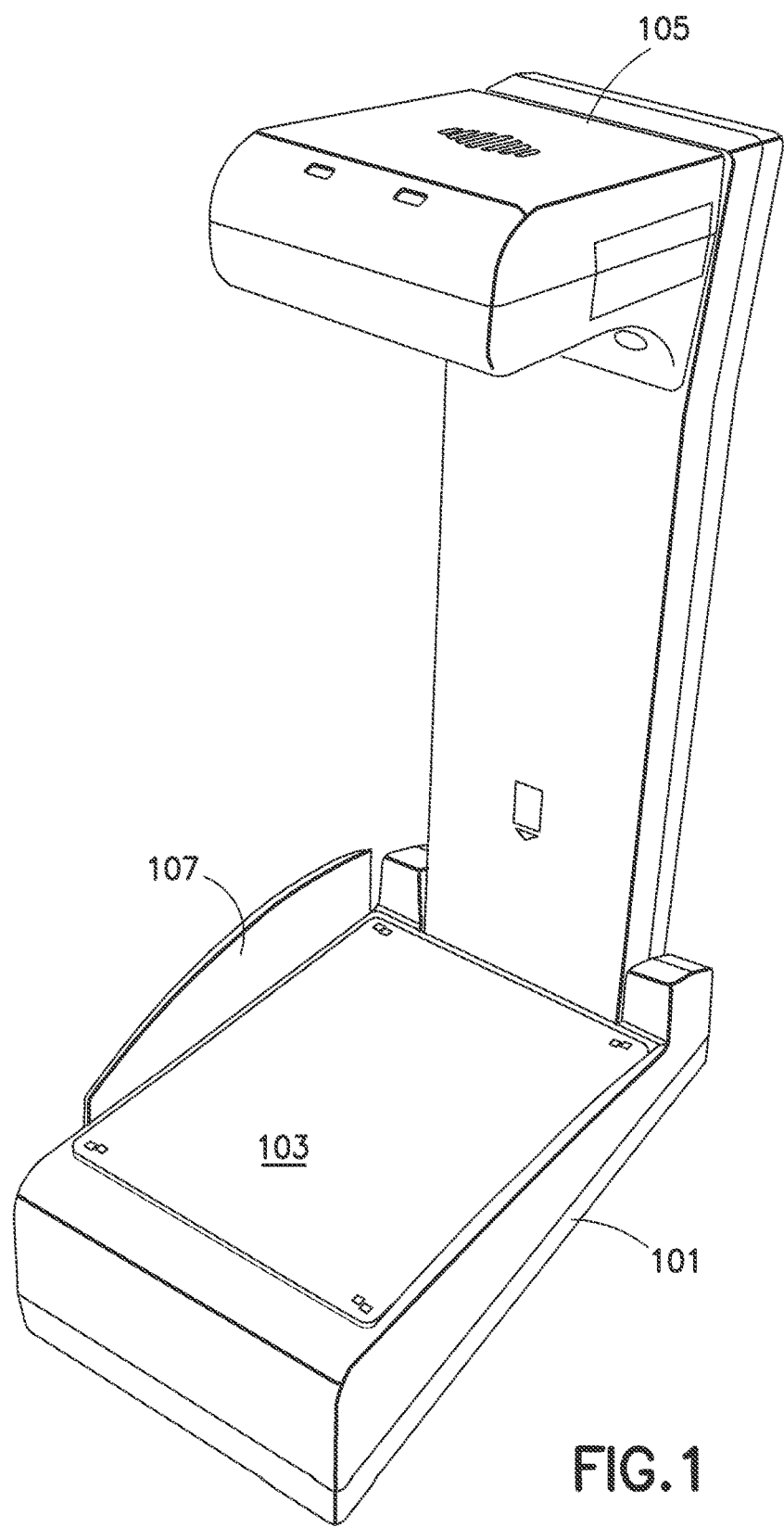
FIGS. 1-3 show systems according to various embodiments of the present invention.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

Detailed embodiments of the present invention are disclosed herein; however, it is to be understood that the disclosed embodiments are merely illustrative of the invention that may be embodied in various forms. In addition, each of the examples given in connection with the various embodiments of the invention is intended to be illustrative, and not restrictive. Further, the figures are not necessarily to scale, some features may be exaggerated to show details of particular components (and any size, material and similar details shown in the figures are, of course, intended to be illustrative and not restrictive). Therefore, specific structural and functional details disclosed herein are not to be interpreted as limiting, but merely as a representative basis for teaching one skilled in the art to variously employ the present invention.

As described herein, various embodiments of the present invention provide systems with image sensors for reading human-marked forms. One or more of such embodiments may reduce or eliminate certain limitations traditionally encountered with conventional image sensors regarding form placement, ambient illumination and/or form flatness.

Further, as described herein, various embodiments of the present invention provide a configuration (e.g., a design) for printed forms intended for users to put handwritten marks such that the forms are suitable for scanning by a single camera. In one example, reliable mark interpretation may achieved no matter the flatness of the form (in this example, as long as the user marks are not obstructed from the camera, the form can be curved, folded or even crumbled).

Further, as described herein, various embodiments of the present invention provide a system which utilizes a form configuration that overcomes the distortions introduced by out-of-plane distortions of the form, therefore allowing the interpretation of the form markings from a single image sensor that can take a full image of the form.

One embodiment of the present invention provides a form, comprising: at least one user marking cell and at least one fiducial mark; wherein the fiducial mark has a measurable property that is essentially scale-invariant (for example, as described in more detail below, such a measurable property may comprise a ratio of an area of the fiducial mark over an area of an interior or "hollow" portion of the fiducial mark).

In one example, the form may be selected from the group consisting of: a lottery play slip; a survey; and a test.

In another example, the form may comprise a plurality of user marking cells.

In another example, the fiducial mark may comprise a hollow outline printed in a color visible to the image sensor (e.g., wherein the ratio of the area of the mark (that is, the area encompassed by the outline (inclusive of the outline)) over the area of the fiducial mark's interior portion (that is, hollow portion) is predetermined).

In another example, the fiducial mark may comprise an outline printed in a color visible to the image sensor and an interior portion printed in a color that is essentially not visible to the image sensor (e.g., wherein the fiducial mark thus appears hollow to the image senor and wherein the ratio of the area of the mark that is, the area encompassed by the outline (inclusive of the outline)) over the area of the fiducial mark's interior portion (that is, hollow portion) is predetermined).

In another example, the fiducial mark may comprise an outline printed in a color visible to the image sensor and an interior portion printed in a color that is also visible to the image sensor, wherein there is sufficient contrast (and/or other distinguishing feature(s)) between the outline and the interior portion for the image sensor to distinguish between the outline and the interior portion (e.g., wherein the ratio of the area of the mark (that is, the area encompassed by the outline (inclusive of the outline)) over the area of the fiducial mark's interior portion (that is, hollow portion) is predetermined).

Figure 4:
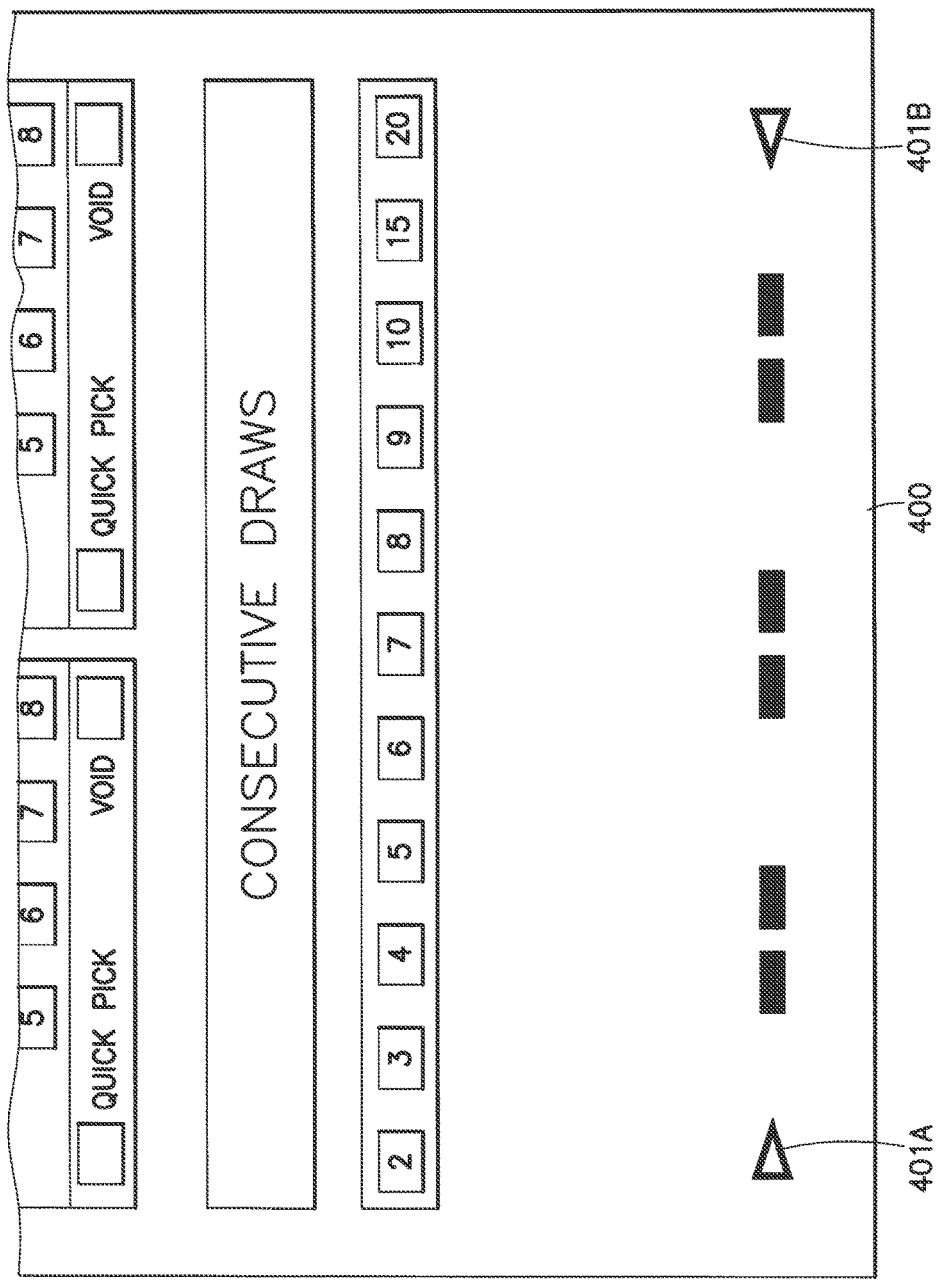
FIG. 4 shows detail of a lottery play slip 400 according to an embodiment of the present invention (attention is directed in particular to fiducial marks 401A and 401B).

In another example, the fiducial mark may be of a shape that provides orientation information (e.g., an isosceles triangle, a trapezoid, a shape shown in FIG. 4 as 401A or 401B).

In another example, the fiducial mark may provide a mechanism via which a distance of the image sensor from the portion of the form upon which the fiducial mark is printed may be determined (e.g., calculated).

In another example, a plurality of fiducial marks may be provided.

In another example, one or more user marking cells (e.g., the outline of such cells) may be printed in a color that is visible to the image sensor.

In another example, indicia may be disposed within one or more user marking cells.

In another example, the indicia may comprise numbers and/or letters.

Another embodiment of the present invention provides a system for interpreting at least one user mark on a form, comprising: an image sensor; and a programmed processor in operative communication with the image sensor; wherein the image sensor and the programmed processor are configured to: (a) calculate a distance between at least a first fiducial mark on the form and a second fiducial mark on the form, wherein the first and second fiducial marks each have a measurable property that is essentially scale-invariant; and (b) interpret at least one user mark in at least one user marking cell on the form based at least in part upon the calculated distance.

In another example, the system may calculate a distance between the image sensor and at least one fiducial mark on the form, wherein the fiducial mark has a measurable property that is essentially scale-invariant.

Another embodiment of the present invention provides a method for interpreting at least one user mark on a form, comprising: (a) calculating a distance between at least a first fiducial mark on the form and a second fiducial mark on the form, wherein the first and second fiducial marks each have a measurable property that is essentially scale-invariant; and (b) interpreting at least one user mark in at least one user marking cell on the form based at least in part upon the calculated distance.

In another example, the method may calculate a distance between the image sensor and at least one fiducial mark on the form, wherein the fiducial mark has a measurable property that is essentially scale-invariant.

Another embodiment of the present invention provides a form, comprising: at least one user marking cell, wherein the user marking cell is in a color that is visible to the image sensor.

In one example, the form may be selected from the group consisting of: a lottery play slip; a survey; and a test.

In another example, the form may comprise a plurality of user marking cells, wherein the plurality of user marking cells is in a color that is visible to the image sensor In another example, the form may further comprise at least one fiducial mark; wherein the fiducial mark has a measurable property that is essentially scale-invariant (for example, as described in more detail below, such a measurable property may comprise a ratio of an area of the fiducial mark over an area of an interior or "hollow" portion of the fiducial mark).

In another example, the fiducial mark may comprise a hollow outline printed in a color visible to the image sensor (e.g., wherein the ratio of the area of the mark (that is, the area encompassed by the outline (inclusive of the outline)) over the area of the fiducial mark's interior portion (that is, hollow portion) is predetermined).

In another example, the fiducial mark may comprise an outline printed in a color visible to the image sensor and an interior portion printed in a color that is essentially not visible to the image sensor (e.g., wherein the fiducial mark thus appears hollow to the image senor and wherein the ratio of the area of the mark that is, the area encompassed by the outline (inclusive of the outline)) over the area of the fiducial mark's interior portion (that is, hollow portion) is predetermined).

In another example, the fiducial mark may comprise an outline printed in a color visible to the image sensor and an interior portion printed in a color that is also visible to the image sensor, wherein there is sufficient contrast (and/or other distinguishing feature(s)) between the outline and the interior portion for the image sensor to distinguish between the outline and the interior portion (e.g., wherein the ratio of the area of the mark (that is, the area encompassed by the outline (inclusive of the outline)) over the area of the fiducial mark's interior portion (that is, hollow portion) is predetermined).

In another example, the fiducial mark may be of a shape that provides orientation information (e.g., an isosceles triangle, a trapezoid, a shape shown in FIG. 4 as 401A or 401B).

In another example, the fiducial mark may provide a mechanism via which a distance of the image sensor from the portion of the form upon which the fiducial mark is printed may be determined (e.g., calculated).

In another example, a plurality of fiducial marks may be provided.

In another example, one or more user marking cells (e.g., the outline of such cells) may be printed in a color that is visible to the image sensor.

In another example, indicia may be disposed within one or more user marking cells.

In another example, the indicia may comprise numbers and/or letters.

Another embodiment of the present invention provides a system for interpreting at least one user mark on a form, comprising: an image sensor and a programmed processor in operative communication with the image sensor; wherein the image sensor and the programmed processor are configured to interpret at least one user mark in at least one user marking cell based at least in part upon at least one user marking cell that is in a color that is visible to the image sensor.

Another embodiment of the present invention provides a method for interpreting at least one user mark on a form, comprising: interpreting at least one user mark in at least one user marking cell based at least in part upon at least one user marking cell that is in a color that is visible to an image sensor.

Another embodiment of the present invention provides detected user marking cells that are associated to the ideally planar user marking cells on the form by comparing the detected locations of the centers of the detected user marking cells with the ideally planar locations of the user marking cells.

In one example, the association is done in a circular manner around the fiducials, progressing from their nearest detected user marking cell, to their most distant (this may be done to take advantage of the known scale in the vicinity of the fiducials). The first center of the nearest detected user marking cell in this example is associated to its nearest ideally planar location of the user marking cell if their separation is smaller than a predetermined amount. In this example, a displacement vector between the associated planar and detected location is calculated. Any consecutive center of the detected user marking cells in this example is first displaced by the amount indicated by the displacement vector of its nearest associated neighbor. The displaced center in this example is then associated to its nearest ideally planar location of the user marking cells if their distance is smaller than a predetermined amount. In this example, the process is repeated for all planar locations of possible user marking cells. Any non-associated planar positions in this example have their displacement vectors interpolated from their associated neighbors.

Of note, all feature(s) of the invention disclosed, for example, in the context of the figures or detailed description, may be separately combinable with any other feature(s) of the invention unless immediately apparent from the context.

Figure 2:
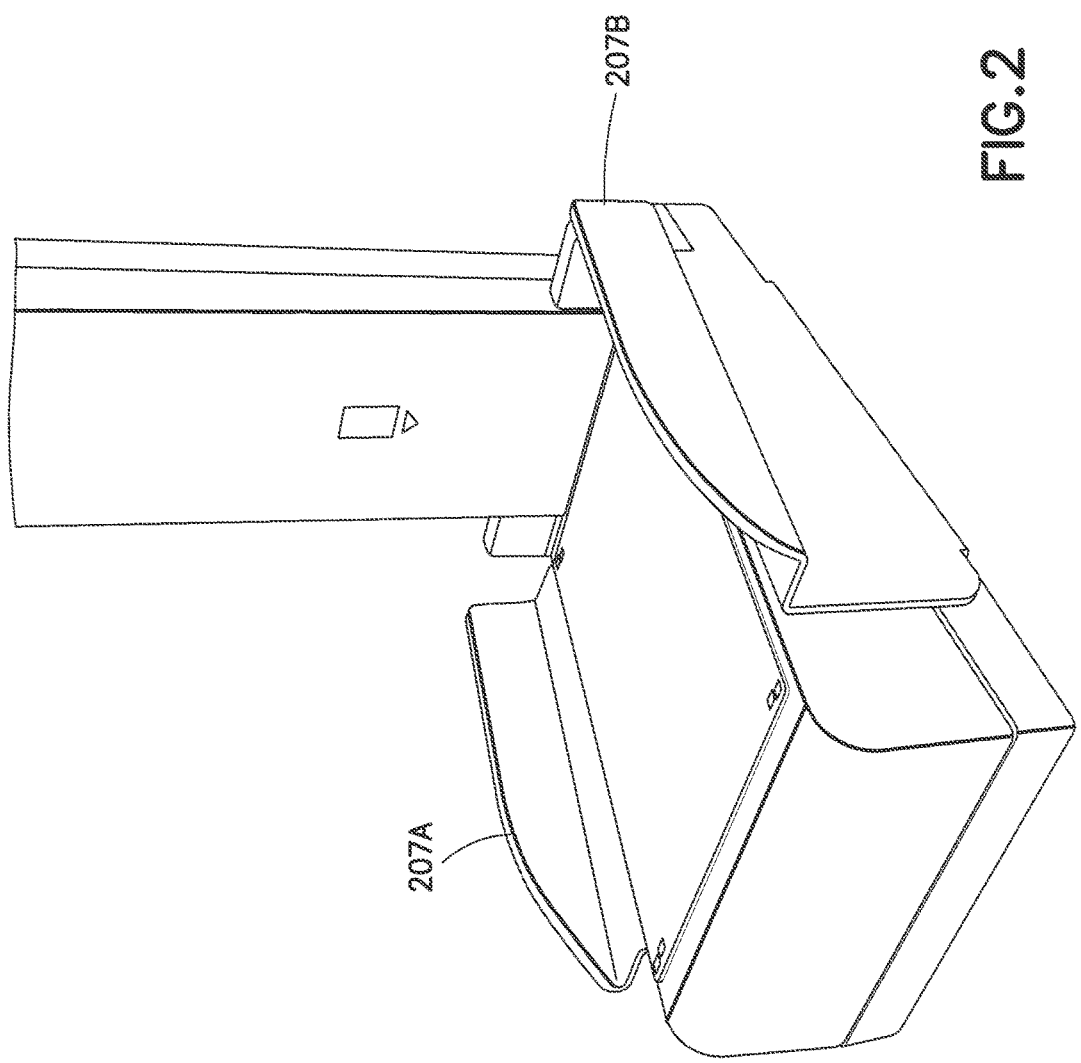

Referring now to FIG. 1, a system 101 according to one embodiment of the present invention comprises a form resting surface 103, above which an image sensor (e.g., a monochrome image sensor) is positioned (the sensor is inside housing 105). In one example, the sensor may have its optical axis offset from the perpendicular to the resting surface 103 by a few degrees. The resting surface 103 may be recessed, bounded or otherwise include barriers or guides so that the forms are placed completely within. One barrier 107 is shown in this FIG. 1; FIG. 2 shows another embodiment with two barriers 207A, 207B. The image sensor may be equipped with a suitable lens, capable of providing images of the form(s) placed on the form resting surface 103 and so designed and aligned, for example, that the image sensor captures images of the full extent of the resting surface 103 and any forms residing on it. An optical filter may be placed in the optical path, for example, in front, behind or inside the lens, so that hues of some specific color (for example red) and its closely matching colors are rendered essentially invisible to the image sensor. In another example, one or more light sources (e.g., Light Emitting Diodes (LEDs) and/or other light sources) may be utilized to provide illumination in cases where the ambient illumination is not sufficient to render the images on the image sensor (the light source(s) may be placed inside housing 105, for example).

Figure 3:
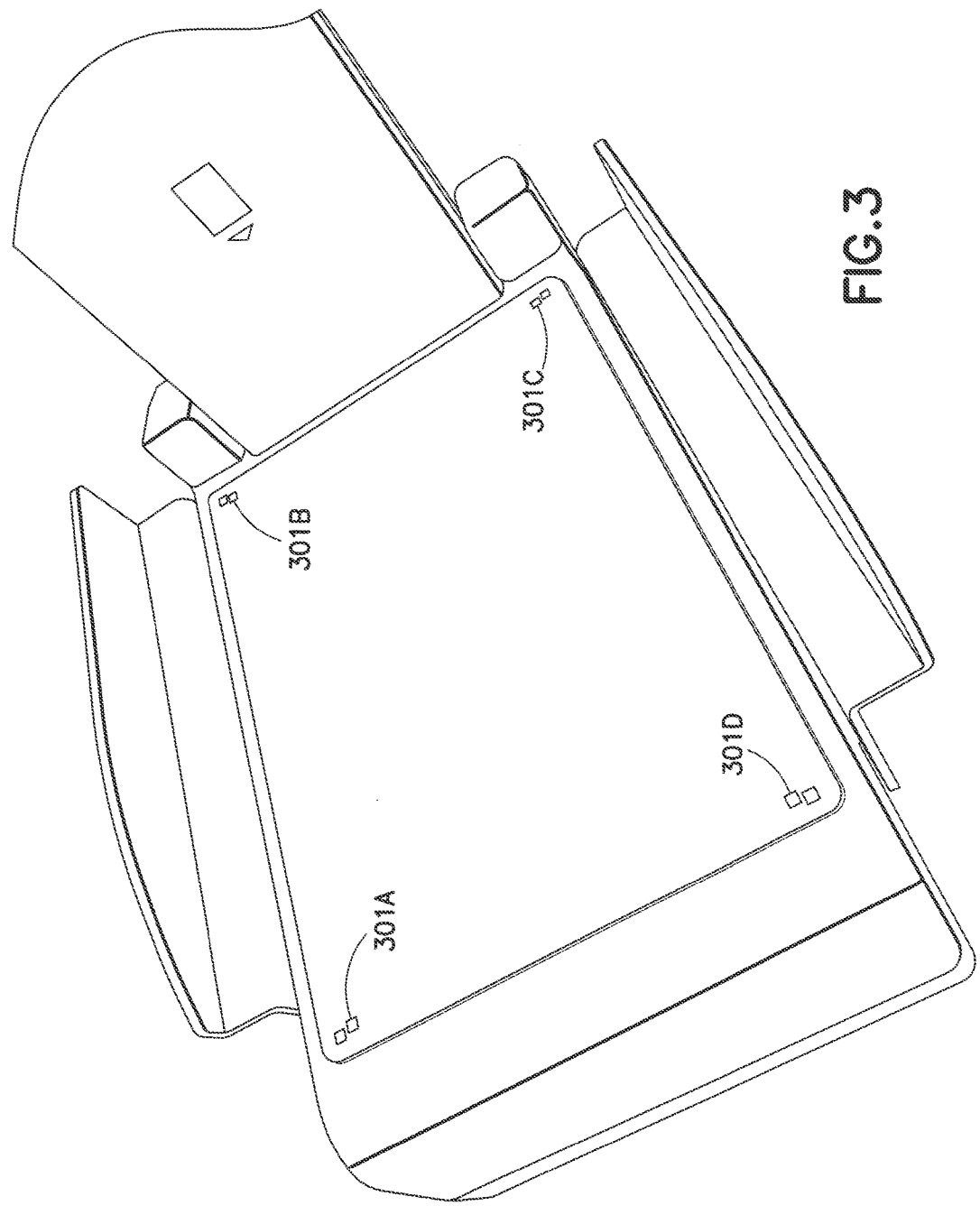

On the form resting surface an a-priori determined pattern of machine visible marks with known dimensions and relative locations may permanently be located (imprinted or otherwise), for example a set of small squares (see, e.g., marks 301A-301D of FIG. 3) These marks may be "initialization" datum to allow, for example, for estimation of the image sensor position with respect to the forms resting surface and for the compensation of the projective transformation distortions due to the relative placement of the form resting surface and the sensor in 3D space. In operation, the system may monitor the form resting surface for the existence of stationary forms (e.g., after a form is moved into view and left by a user). Upon detection of such a situation, a high-resolution image may be captured and processed to extract the user marks (e.g., from a single form which is placed on the resting surface or from the topmost form in a stack of forms). This may be done by detecting the form of interest in the image, extracting printed and user marks in it and associating user marks with specific cells intended for marking.

Reference will now be made to form curvature, folding and/or crumbling, resulting in non-planar distortions. When such distorted forms are imaged by the image sensor, the distortions typically result in local projective transformations that do not preserve the global scale and orientation (as these may be estimated, for example, from the form resting surface marks and the machine-readable markings on the form). As a result, under these conditions the exact position of the user cells may not be inferred adequately from the machine readable markings along one or more edges of the form.

To aid in interpretation of the user marks on such a non-planar form, a form according to an embodiment of the present invention may carry thereon:
 1. A plurality of scale-invariant machine-printed marks (termed "fiducial marks") for the detection of the form; and
 2. Non-blind color border on each of the cells intended for user marking.

Reference will now be made to an embodiment of certain machine-readable markings, that is, fiducial marks.

Figure 5:
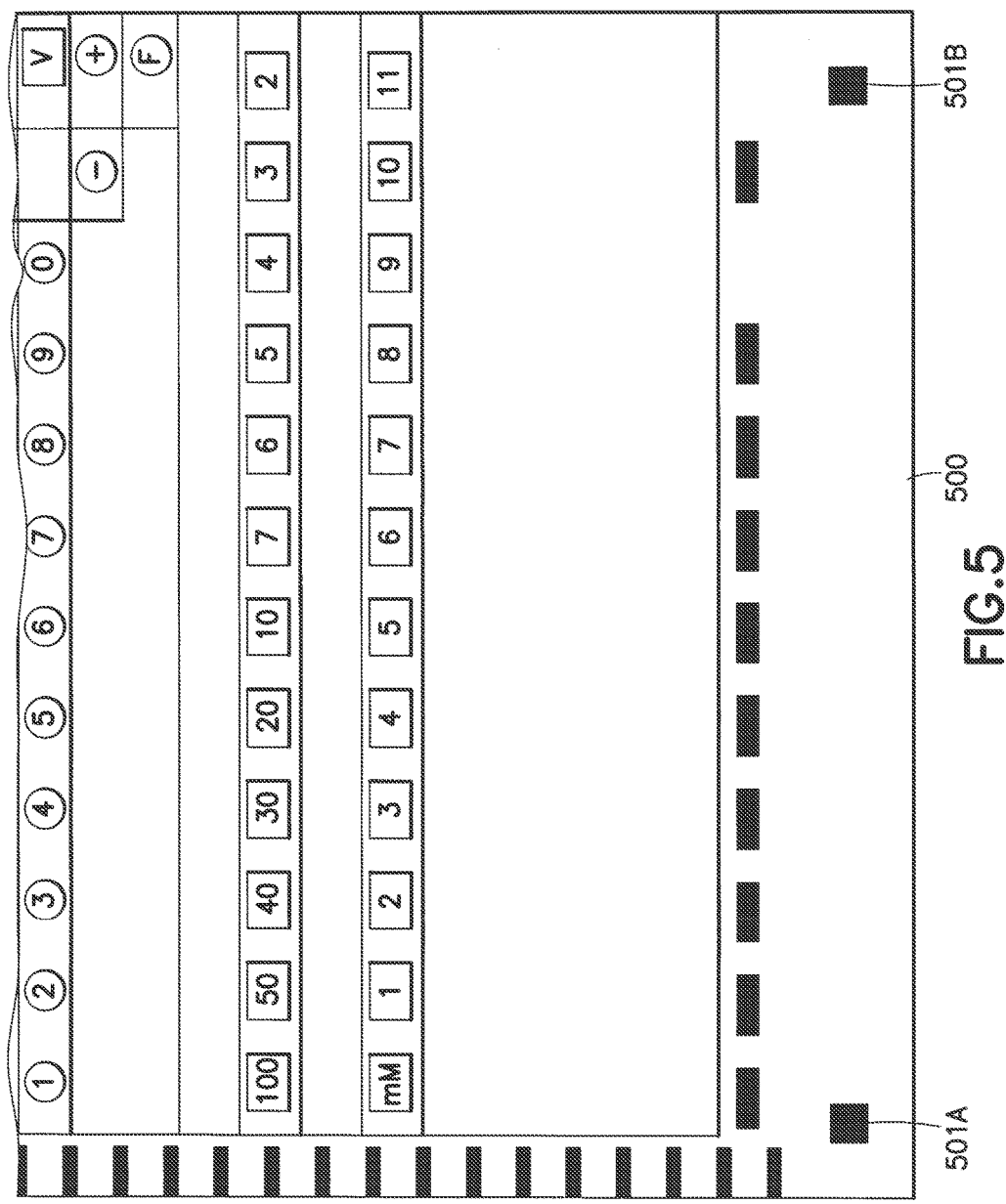
FIG. 5 shows detail of a conventional lottery play slip 500 (attention is directed in particular to conventional fiducial marks 501A and 501B).
Figure 11:
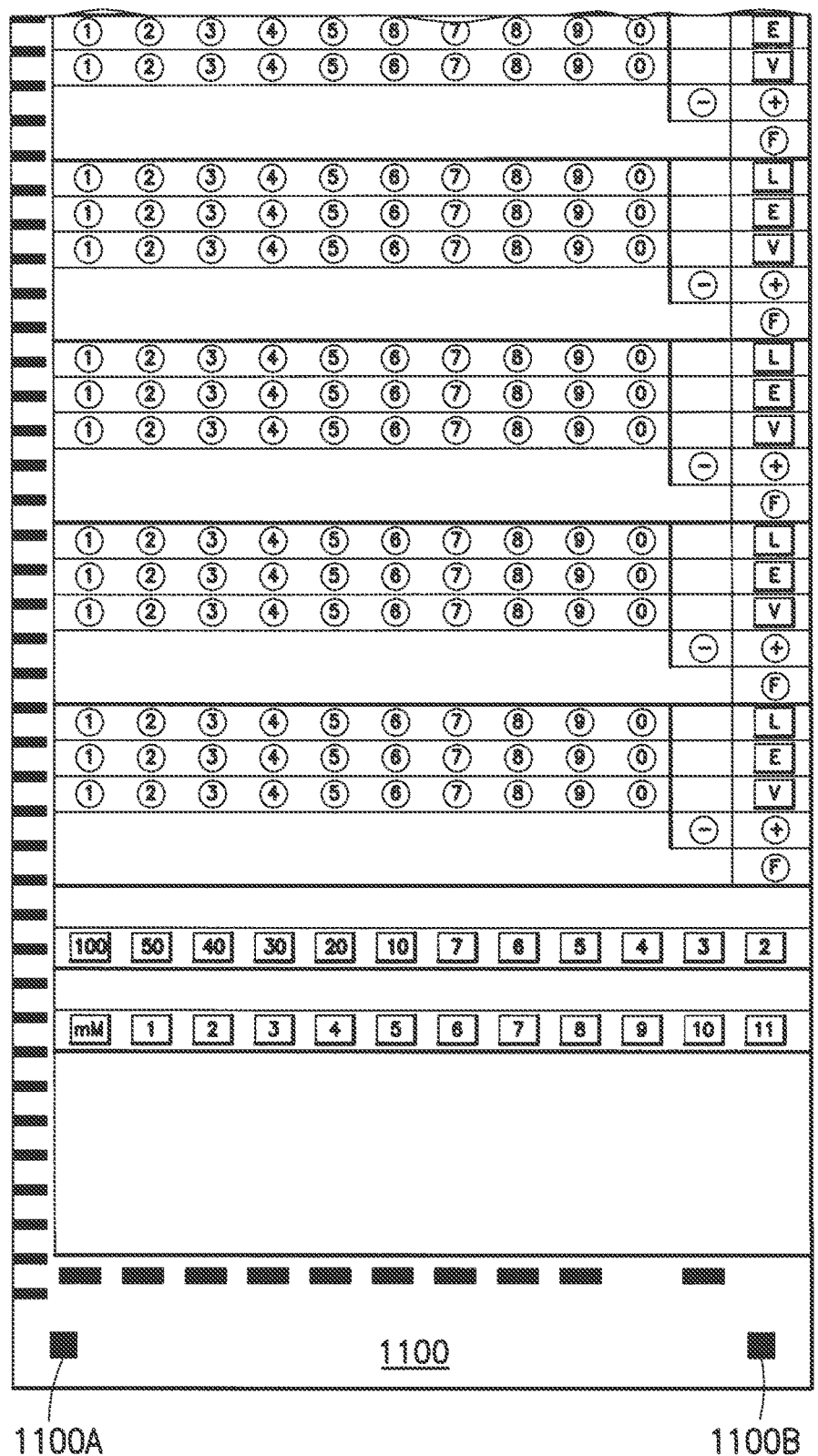
FIG. 11 shows a view of a portion of conventional lottery play slip 1100 (attention is directed in particular to conventional fiducial marks 1101A and 1101B and attention is directed in particular to the grid of user marking calls bounded by a blind color).

The detection may be performed by checking for valid groups of printed fiducial marks that all need to be present in the image if the form under question is the topmost one in the stack. In one example, a number of predetermined machine-readable fiducial marks are printed on the form, and such fiducial marks may be used to estimate the relative shift and rotation of the form, as well as any scale difference (e.g., caused by stacking multiple (and possibly non-planar forms) and hence reducing the distance of the topmost (and/or non-planar) form from the camera). Location of these machine-readable fiducial marks relative to the user marking cells must, in one example, be known a priori—but their absolute location on the form is not critical. The design of the machine-readable fiducial marks may be made specifically so that the shape of the machine-readable fiducial mark conveys information of scale and orientation of the mark (and consequently of the form it is carried upon) with respect to the image sensor. Special care may be given in the design of the machine readable fiducial marks to make sure that they have a measurable property that is scale-invariant (typically, under non-planar form distortions, size information is lost and shapes are distorted). To be able to detect the fiducial marks under these circumstances, the fiducial marks (see, e.g., 401A, 401B of FIGS. 4 and 6 and 701A, 701B of FIG. 7) may be designed as hollow objects, e.g., where the ratio of the area of the mark (that is, the area encompassed by the outline (inclusive)) over the area of the fiducial mark's interior (or hollow) portion is predetermined. In one example, the hollow objects may comprise an outline only; in another example, the hollow objects may comprise a machine readable outline with the interior printed in a blind color (in contrast to such hollow objects, see, e.g., traditional fiducial marks 501A, 501B (essentially solid squares) of FIGS. 5 and 6, and traditional fiducial marks 1100A, 11001B (essentially solid squares) of FIG. 11). Since this ratio of the area of the mark over the area of the mark's hollow is invariant to scale changes, such configuration may allow for the detection of the fiducial marks at any distance from the camera (in order to determine distance from the camera).

Figure 12:
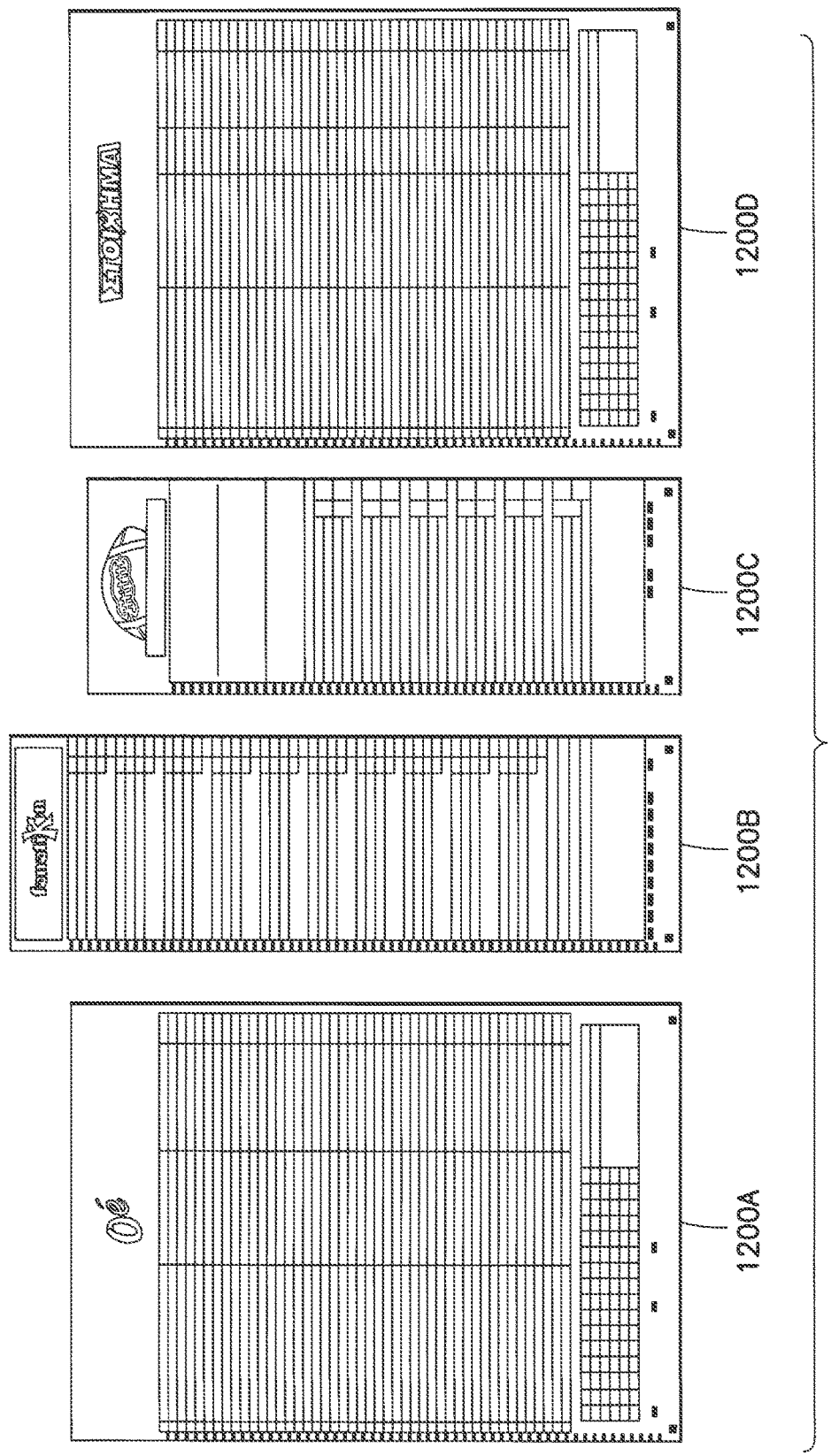
FIG. 12 shows a view of a number of conventional lottery play slips 1200A-1200D (attention is directed in particular to conventional fiducial marks, attention is directed in particular to the grid of user marking calls bounded by a blind color, and attention is directed to the "clocks" (that is, the markings along one or more sides of the forms).

Reference will now be made to the user area form design. As has traditionally been done, several small cells are provided for the users to mark with any mark they desire (the cells may be laid, for example, in a typical uniform rectangular grid pattern). In the past, the user marking cells have been printed in a machine-invisible color in order to reduce the detection burden for the machine (see, e.g., lottery play slip 700B of FIG. 7, lottery play slip 900 of FIG. 9, lottery play slip 1000B of FIG. 10, lottery play slip 1100 of FIG. 11 and lottery play slips 1200A-1200D of FIG. 12). In contrast, under various embodiments of the present invention, the cells where users can place marks may have their outline printed in some non-blind color, thus making each individual cell visible to the machine (see, e.g., lottery play slip 800 of FIG. 8 and lottery play slip 1000A of FIG. 10). This aids in the detection of each user marking cell under non-planar distortion. Of course, due to the non-planar distortion, the detected user marking cells are no longer arranged on the grid originally designed for the form, i.e. the expected cell locations. To correctly interpret the user marks, the detected cells need to be associated to the expected cell locations. This may be done, for example, by starting from the user marking cells closest to the fiducial marks. Upon association to an expected cell location, a displacement vector may be obtained for the detected cell. Adjacent user marking cells may be subsequently detected using the displacement of their neighbors as reference, the process being repeated to gradually reveal the complete pattern of the cell layout of the form on the image picture elements. Of note, following this arrangement the user marking cells are not restricted to being either on a uniform nor a rectangular grid arrangement, but they can appear in any desired location that artistic taste desires (in one example, the user marking cells may need to be separated by a minimum predetermined distance).

Any user marking cells that are not detected (e.g., due to adverse illumination conditions) may have their displacement vectors estimated by interpolating the displacement vectors of their neighbors. As a result, the positions of all user marking cells on the image of the form, as it is captured by the image sensor, may be either estimated if the user marking cell itself is not detected, or discovered by detection of the cell boundary.

The system may then proceed to extract any possible user marks from areas of the image around the previously determined user marking cell centers. As non-planar distortions can cause self-shadowing and ambient illumination can cause other shadows, disturbing the user mark detection process, it may be important to attenuate their effect prior to finding candidate image pixels that indicate the presence of a user mark. This may be done, for example, by estimating a two-dimensional linear gradient of the luminosity based on the pixels outside the visible user marking cell boundaries. The usage of these pixels may be beneficial, since it is typically rare for a user mark to extend out of the user cell boundaries.

The linear gradient may then be compensated around the image region around the user marking cell center. The existence of user marks may then substantiated by examining the processed information inside each cell.

Table 1, below, provides additional detail regarding a detection/determination method (e.g., a computer implemented algorithm) according to an embodiment of the present invention.

TABLE 1

1. Image binarization for printed marks
2. Valid fiducial & ID stripe combination? If no, discard. If yes proceed to 3
3. Horizontal & vertical filtering and binarization for detection of the boundary of the user marking cells
4. Morphological processing for the extraction of the centers of the detected user marking cells

| 5. For every detected user cell | 5.a. Project from image plane onto form coordinate system using intrinsic camera parameters |
| --- | --- |
| | 5.b. Displace detected center according to displacement of already associated neighbors |
| | 5.c. Attempt association with a planar position of the user marking cells. If no, discard. If yes proceed to 5.d. |
| | 5.d. Estimate displacement vector |
| | 5.e. Loop to 5.a. |
| 6. For every non-associated planar position | 6.a. Estimate displacement vector by interpolating vectors of associated neighbors |
| | 6.b. Project displaced ideal cell center onto image |
| | 6.c. Loop to 6.a. |
| 7. For every user marking cell center on image | 7.a. Estimate local white level using empty area between user marking cell boundaries |
| | 7.b. Binarize the interior of user marking cell using local white level estimate |
| | 7.c. Gather active pixels to form evidence of user mark in cell |
| | 7.d. Declare existence of user mark if evidence exceeds a predetermined amount |
| | 7.e. Loop to 7.a. |

Figure 13A:
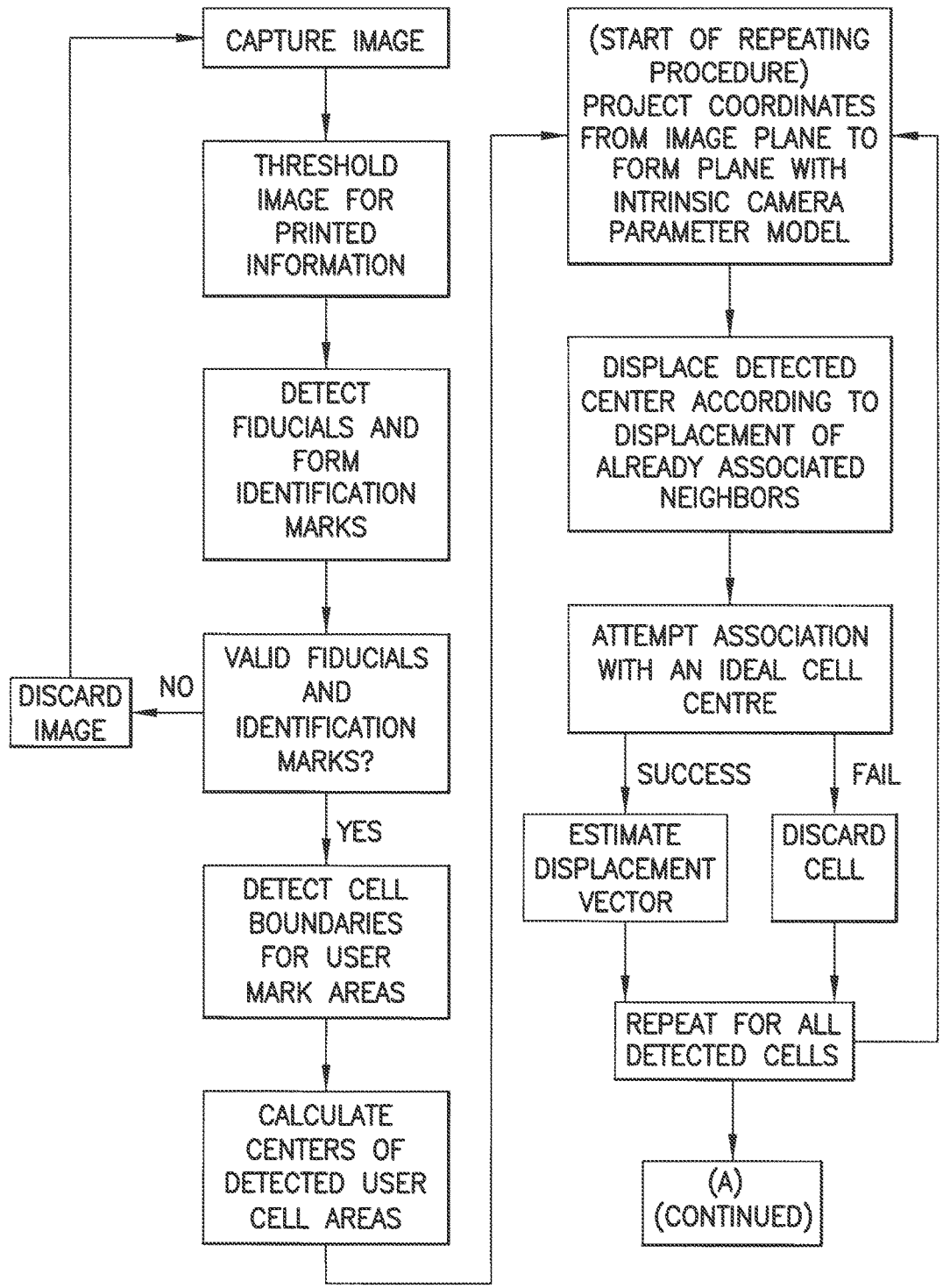
FIGS. 13A and 13B show a flowchart providing additional detail regarding a detection/determination method according to an embodiment of the present invention (of course, as seen, the flow continues from (A) at the bottom of FIG. 13A to (A) at the top of FIG. 13B).
Figure 13B:
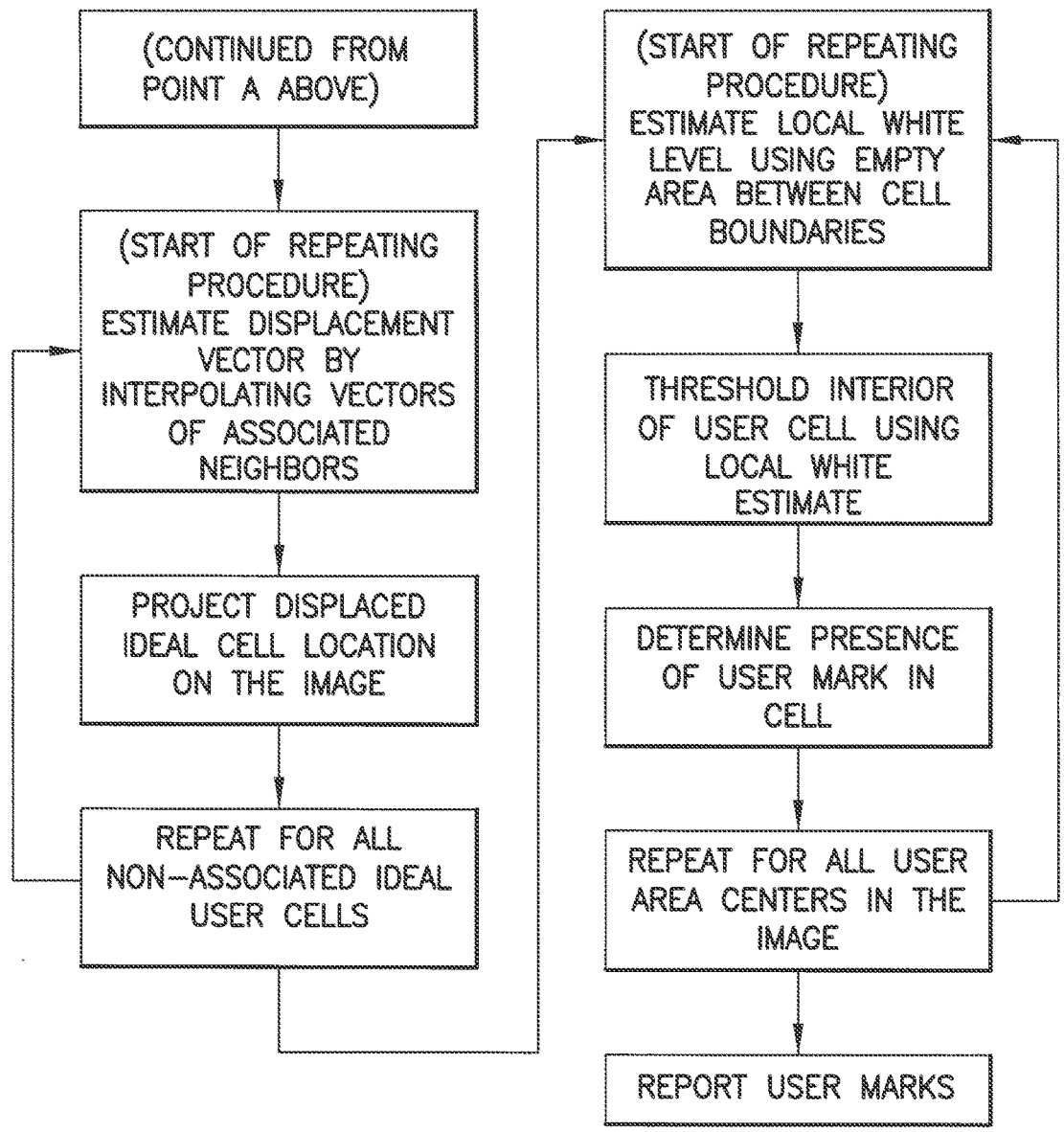

Referring now to FIGS. 13A and 13B, a flowchart providing additional detail regarding a detection/determination method (e.g., a computer implemented algorithm) according to the embodiment of Table 1 is shown. More particularly, as seen in FIG. 13A this method may begin with the capture of an image (e.g., by an image sensor). Further, as seen in FIG. 13B this method may end with a report of user marks (e.g., a report in digital form to a computer, printer and/or other device such that a lottery ticket evidencing the user's selection(s) may be output, such that survey results(s) may be output, or such that test result(s)/score(s) may be output).

In another embodiment, a method for detecting user marks is provided, comprising: placing a form (see, e.g., form 400 of FIGS. 4 and 6 and form 700A of FIG. 7) in a field of view of a camera (see, e.g., system 101 of FIG. 1, which may include a camera), wherein the form includes thereon at least a first fiducial mark (see, e.g., fiducial marks 401A and 401B of form 400 of FIGS. 4 and 6 and fiducial marks 701A and 701B of form 700A of FIG. 7) and a second fiducial mark (see, e.g., fiducial marks 401A and 401B of form 400 of FIGS. 4 and 6 and fiducial marks 701A and 701B of form 700A of FIG. 7), and wherein each of the first fiducial mark and the second fiducial mark has a measurable property that is essentially scale invariant; utilizing the camera to generate an electronic image of at least a portion of the form; calculating with a processor mechanism (see, e.g., system 101 of FIG. 1, which may include a processor mechanism) in operative communication with the camera, based at least in part upon the electronic image, a distance between at least the first fiducial mark and the second fiducial mark; detecting with the processor mechanism at least a first user marking cell on the form, wherein the first user marking cell is bounded by at least one indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the first user marking cell is detected based at least in part upon the calculated distance between the first fiducial mark and the second fiducial mark; calculating with the processor mechanism a displacement vector of the detected first user marking cell versus an ideal planar position of the detected first user marking cell; detecting with the processor mechanism at least a second user marking cell on the form, wherein the second user marking cell is bounded by at least one indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the second user marking cell is detected based at least in part upon the displacement vector of the detected first user marking cell; determining with the processor mechanism evidence of at least a first user mark in the detected first user marking cell based at least in part upon a degree of brightness similarity between: (a) at least a portion of the electronic image surrounding the indicium bounding the first user marking cell; and (b) at least a portion of the electronic image included inside the indicium bounding the first user marking cell; and determining with the processor mechanism evidence of at least a second user mark in the detected second user marking cell based at least in part upon a degree of brightness similarity between: (a) at least a portion of the electronic image surrounding the indicium bounding the second user marking cell; and (b) at least a portion of the electronic image included inside the indicium bounding the second user marking cell.

In one example, the method may further comprise: calculating with the processor mechanism a displacement vector of the detected second user marking cell versus an ideal planar position of the detected second user marking cell; and detecting with the processor mechanism at least a third user marking cell on the form, wherein the third user marking cell is bounded by at least one indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the third user marking cell is detected based at least in part upon at least one of: (a) the displacement vector of the detected first user marking cell; and (b) the displacement vector of the detected second user marking cell.

In another example, the method may further comprise: determining with the processor mechanism evidence of at least a third user mark in the detected third user marking cell based at least in part upon a degree of brightness similarity between: (a) at least a portion of the electronic image surrounding the indicium bounding the third user marking cell; and (b) at least a portion of the electronic image included inside the indicium bounding the third user marking cell.

In another example, the third user marking cell may be detected based at least in part upon at least both of: (a) the displacement vector of the detected first user marking cell; and (b) the displacement vector of the detected second user marking cell.

In another example, the third user marking cell may be detected based at least in part upon interpolation between: (a) the displacement vector of the detected first user marking cell; and (b) the displacement vector of the detected second user marking cell.

In another example, the method may further comprise: detecting with the processor mechanism at least a third user marking cell on the form, wherein the third user marking cell is bounded by an indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the third user marking cell is detected based at least in part upon at least one of: (a) a position of the detected first user marking cell; and (b) a position of the detected second user marking cell.

In another example, the method may further comprise: determining with the processor mechanism evidence of at least a third user mark in the detected third user marking cell based at least in part upon a degree of brightness similarity between: (a) at least a portion of the electronic image surrounding the indicium bounding the third user marking cell; and (b) at least a portion of the electronic image included inside the indicium bounding the third user marking cell.

In another example, the third user marking cell may be detected based at least in part upon at least both of: (a) the position of the detected first user marking cell; and (b) the position of the detected second user marking cell.

In another example, the third user marking cell may be detected based at least in part upon interpolation between: (a) the position of the detected first user marking cell; and (b) the position of the detected second user marking cell.

In another example, the method may further comprise determining with the processor mechanism when the form becomes essentially stationary after being placed in the field of view of the camera.

In another example, the method may further comprise decoding with the processor mechanism identification information on the form.

In another example, at least a first indicium bounding the first user marking cell may form a closed boundary and at least a second indicium bounding the second user marking cell may form a closed boundary.

In another example, each indicium bounding each user marking cell may be printed in ink.

In another example, each indicium may be visible to both the camera and a human.

In another example, the processor mechanism may comprise a single processor (see, e.g., system 101 of FIG. 1, which may include a single processor).

In another example, the processor mechanism may comprise a plurality of processors (see, e.g., system 101 of FIG. 1, which may include a plurality of processors).

In another example, the form may be selected from the group consisting of: a lottery play slip; a survey; and a test.

In another example, the camera may comprise at least one image sensor (see, e.g., system 101 of FIG. 1, which may include at least one image sensor).

In another example, the camera may comprise at least one lens (see, e.g., system 101 of FIG. 1, which may include at least one lens).

In another example, the user marking cells may be laid out in a grid pattern, with essentially uniform spacing between adjacent user marking cells in at least one of a horizontal direction and a vertical direction.

In another example, the user marking cells may be laid out in a grid pattern, with essentially uniform spacing between adjacent user marking cells in both a horizontal direction and a vertical direction.

In another example, the user marking cells may be laid out in a non-grid pattern.

Figure 6:
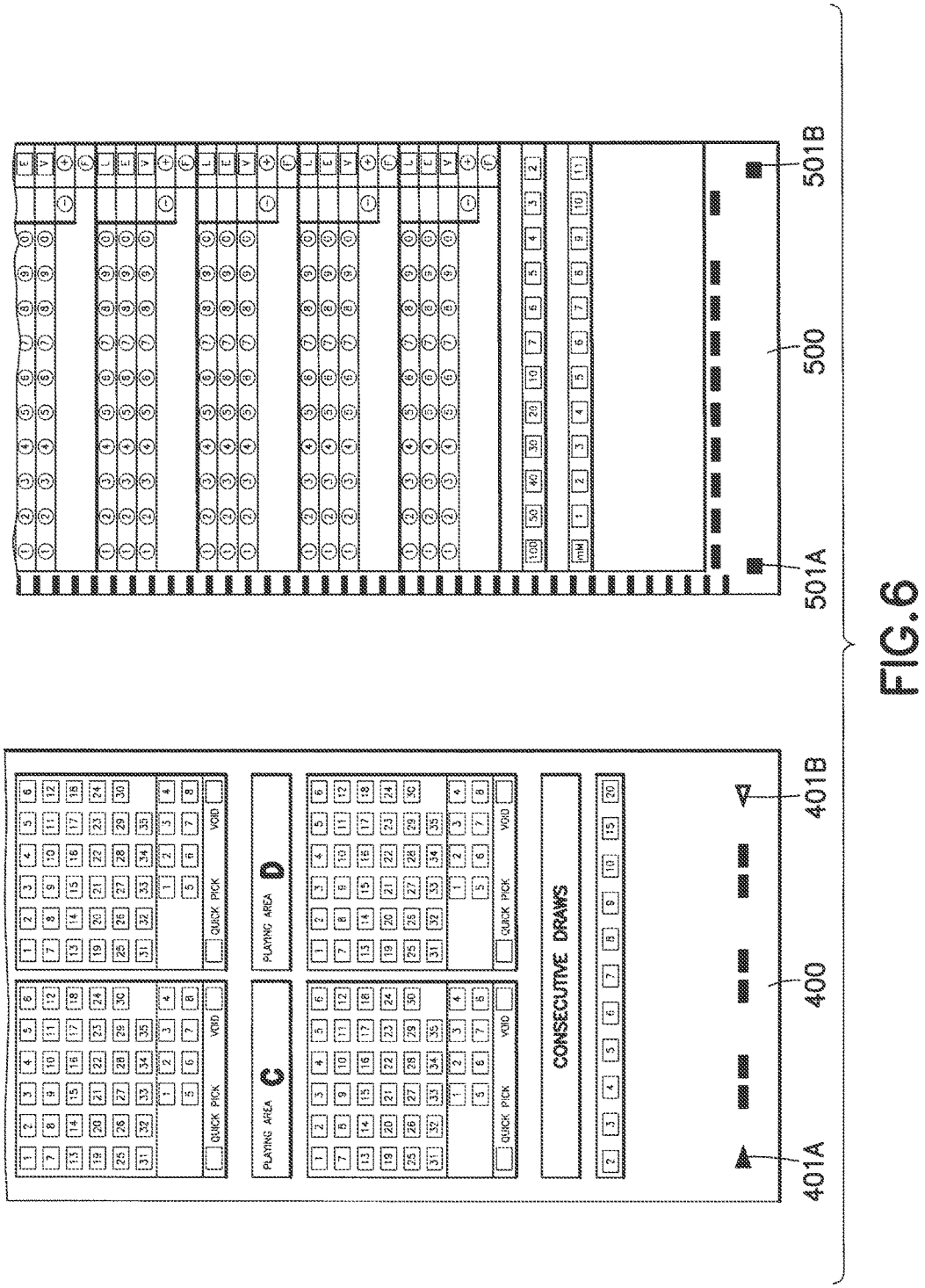
FIG. 6 shows a view of a larger portion of lottery play slips 400 and 500 (of FIGS. 4 and 5, respectively).
Figure 7:
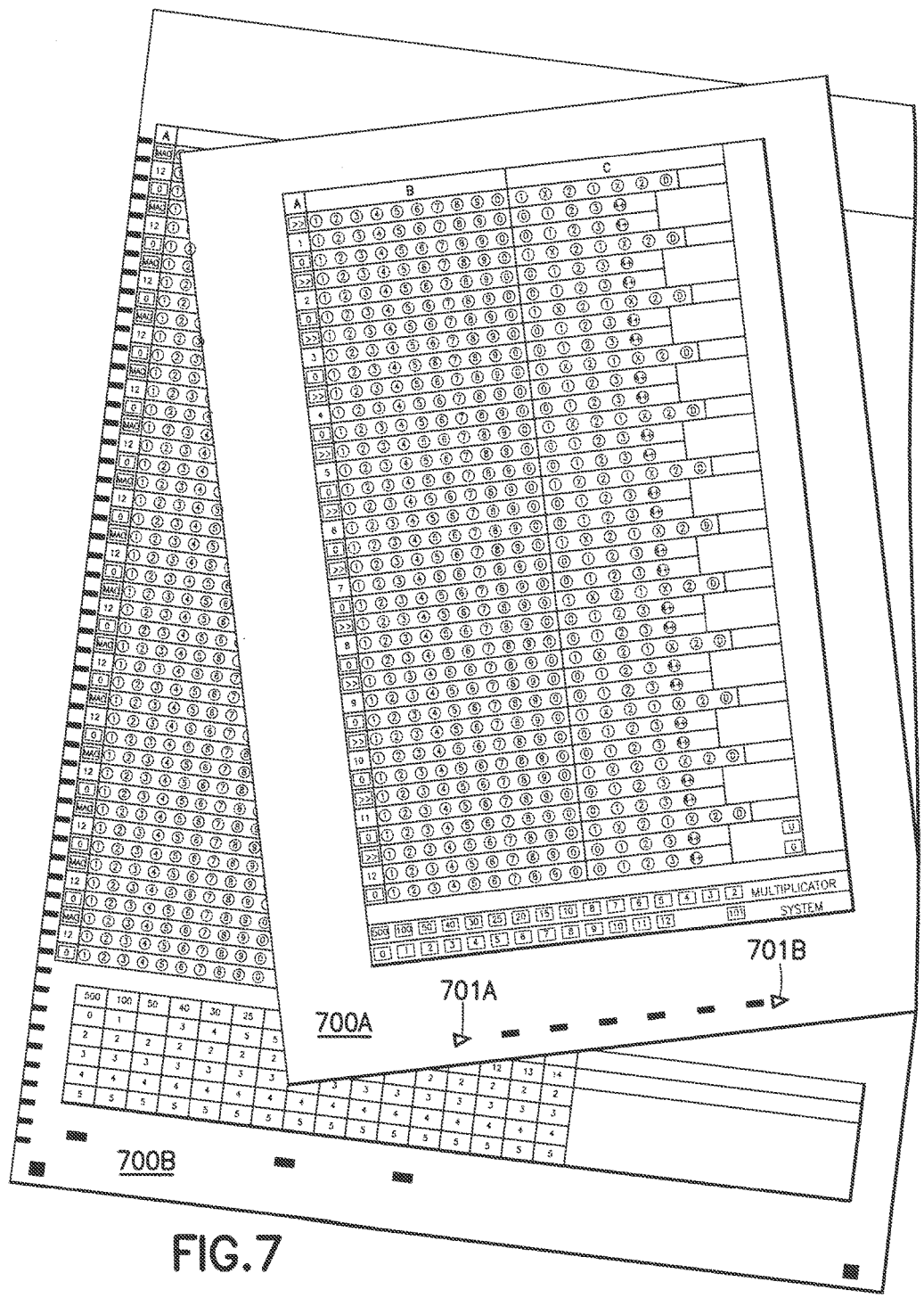
FIG. 7 shows a view of a large portion of lottery play slips 700A and 700B (lottery play slip 700A incorporates various embodiments of the present invention such as fiducial marks 701A, 701B and user marking calls bounded by a non-blind color while lottery play slip 700B is of a conventional type).
Figure 8:
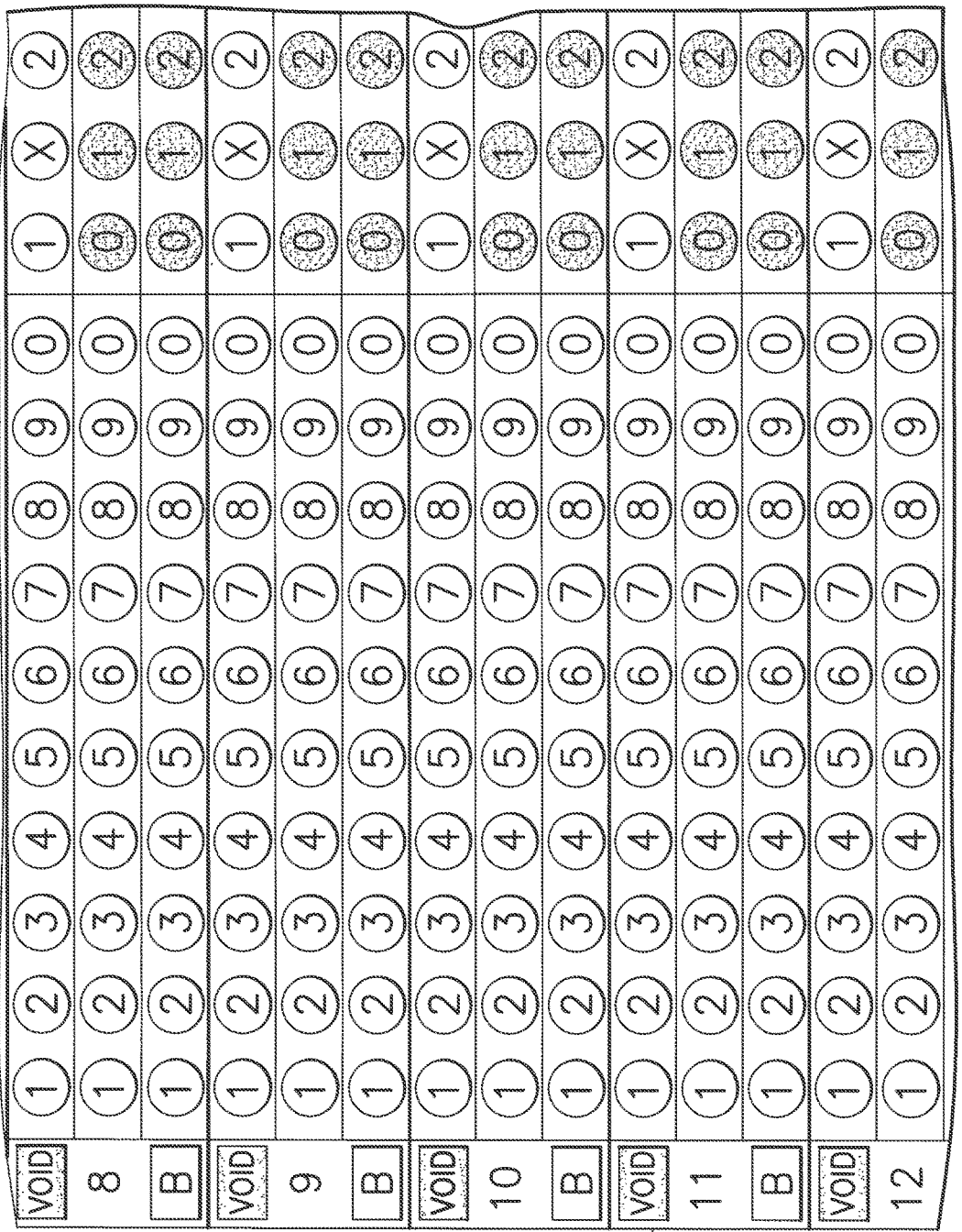
FIG. 8 shows detail of a lottery play slip 800 according to an embodiment of the present invention (attention is directed in particular to the grid of user marking cells bounded by a non-blind color).
Figure 9:
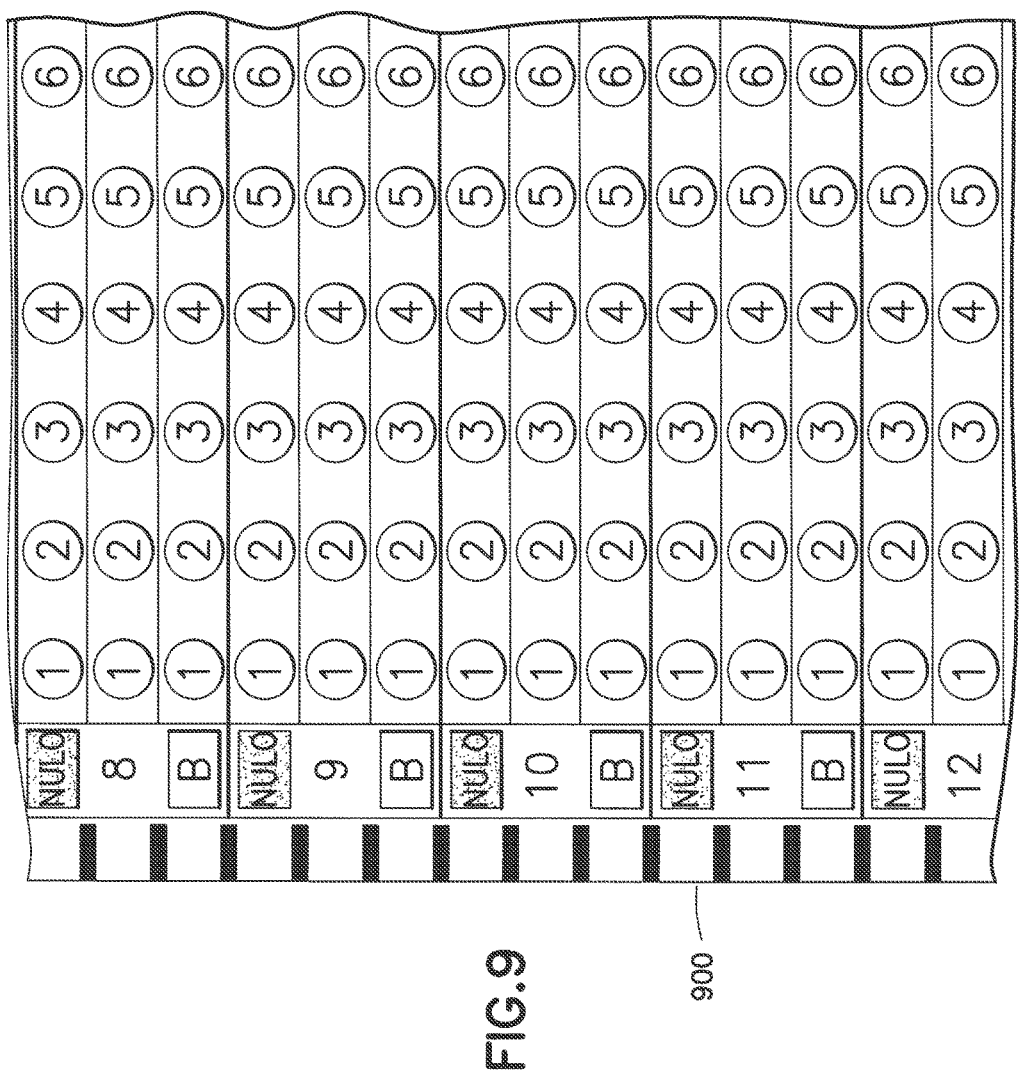
FIG. 9 shows detail of a conventional lottery play slip 900 (attention is directed in particular to the grid of user marking cells bounded by a blind color).
Figure 10:
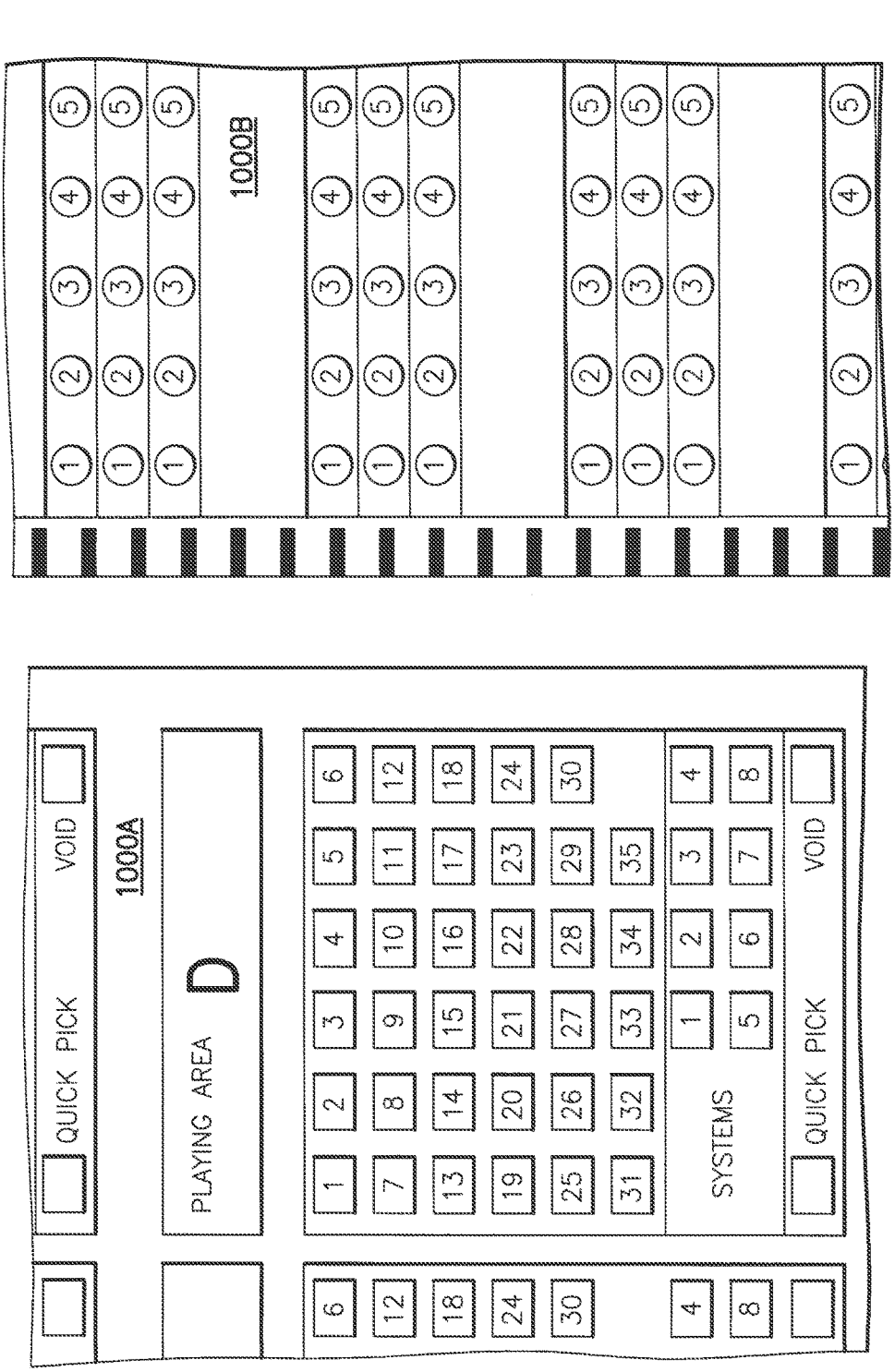
FIG. 10 shows a view of a portion of lottery play slips 1000A and 1000B (lottery play slip 1000A incorporates various embodiments of the present invention such as user marking cells bounded by a non-blind color).

In another example, the method may further comprise at least one indicium inside at least one user marking cell (see, e.g., user marking cells of form 400 in FIGS. 4 and 6, user marking cells of form 700A of FIG. 7, user marking cells of form 800 of FIG. 8 and user marking cells of form 1000A of FIG. 10).

In another example, the indicium inside the user marking cell may comprise at least one of a number and a letter, printed in ink invisible to the camera and visible to humans (see, e.g., user marking cells of form 400 in FIGS. 4 and 6, user marking cells of form 700A of FIG. 7, user marking cells of form 800 of FIG. 8 and user marking cells of form 1000A of FIG. 10).

In another example, the steps may be carried out in the order recited.

In another embodiment, a system for detecting user marks is provided, comprising: a camera (see, e.g., system 101 of FIG. 1, which may include a camera); a processor mechanism (see, e.g., system 101 of FIG. 1, which may include a processor mechanism) in operative communication with the camera; and at least one form (see, e.g., form 400 of FIGS. 4 and 6 and form 700A of FIG. 7), wherein the form includes thereon at least a first fiducial mark and a second fiducial mark (see, e.g., fiducial marks 401A and 401B of form 400 of FIGS. 4 and 6 and fiducial marks 701A and 701B of form 700A of FIG. 7), and wherein each of the first fiducial mark and the second fiducial mark has a measurable property that is essentially scale invariant; wherein, when the form is placed in a field of view of the camera, the camera and the processor mechanism operate to carry out the following steps: generating, with the camera, an electronic image of at least a portion of the form; calculating with the processor mechanism, based at least in part upon the electronic image, a distance between at least the first fiducial mark and the second fiducial mark; detecting with the processor mechanism at least a first user marking cell on the form, wherein the first user marking cell is bounded by at least one indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the first user marking cell is detected based at least in part upon the calculated distance between the first fiducial mark and the second fiducial mark; calculating with the processor mechanism a displacement vector of the detected first user marking cell versus an ideal planar position of the detected first user marking cell; detecting with the processor mechanism at least a second user marking cell on the form, wherein the second user marking cell is bounded by at least one indicium that is visible to the camera (see, e.g., user marking cells of form 400 in FIGS. 4 and 6, user marking cells of form 700A of FIG. 7, user marking cells of form 800 of FIG. 8 and user marking cells of form 1000A of FIG. 10), and wherein the second user marking cell is detected based at least in part upon the displacement vector of the detected first user marking cell; determining with the processor mechanism evidence of at least a first user mark in the detected first user marking cell based at least in part upon a degree of brightness similarity between: (a) at least a portion of the electronic image surrounding the indicium bounding the first user marking cell; and (b) at least a portion of the electronic image included inside the indicium bounding the first user marking cell; and determining with the processor mechanism evidence of at least a second user mark in the detected second user marking cell based at least in part upon a degree of brightness similarity between: (a) at least a portion of the electronic image surrounding the indicium bounding the second user marking cell; and (b) at least a portion of the electronic image included inside the indicium bounding the second user marking cell.

In one example, the camera may comprise at least one image sensor (see, e.g., system 101 of FIG. 1, which may include at least one image sensor).

In another example, the camera may comprise at least one lens (see, e.g., system 101 of FIG. 1, which may include at least one lens).

In another example, the processor mechanism may comprise a single processor (see, e.g., system 101 of FIG. 1, which may include a single processor).

In another example, the processor mechanism may comprise a plurality of processors (see, e.g., system 101 of FIG. 1, which may include a plurality of processors).

In another example, the steps carried out by the camera and the processor mechanism may be carried out in the order recited.

In another example, the system may further comprise calculating, with the processor mechanism, the presence of an immobile form.

In another example, each of one or more fiducial marks may appear as essentially scale invariant to an algorithm (e.g., an algorithm processed by a processor mechanism).

In another example, each of one or more fiducial marks may have a measurable property that is essentially scale invariant (e.g., essentially scale invariant to an algorithm processed by a processor mechanism).

In another example, a brightness similarity described herein may relate to a white level (e.g., a local white level).

In another example, an intensity similarity may be utilized in a manner akin to the brightness similarity described herein.

In another example, a luminosity similarity may be utilized in a manner akin to the brightness similarity described herein.

For the purposes of this disclosure, a computer readable medium is a medium that stores computer data/instructions in machine readable form. By way of example, and not limitation, a computer readable medium can comprise computer storage media as well as communication media, methods and/or signals. Computer storage media includes volatile and/or non-volatile, removable and/or non-removable media implemented in any method and/or technology for storage of information such as computer-readable instructions, data structures, program modules and/or other data. Computer storage media includes, but is not limited to, RAM, ROM, EPROM, EEPROM, flash memory and/or other solid state memory technology; CD-ROM, DVD, and/or other optical storage; cassettes, tape, disk, and/or other magnetic storage devices; and/or any other medium which can be used to tangibly store the desired information and which can be accessed by the computer.

Further, the present invention may, of course, be implemented using any appropriate computer readable medium, computer hardware and/or computer software. In this regard, those of ordinary skill in the art are well versed in the type of computer hardware that may be used (e.g., one or more mainframes, one or more server computers, one or more client computers, one or more mini-computers, one ore more personal computers ("PC"), one or more networks (e.g., an intranet and/or the Internet)), the type of computer programming techniques that may be used (e.g., object oriented programming), and the type of computer programming languages that may be used (e.g., C++, Basic). The aforementioned examples are, of course, illustrative and not restrictive.

Of course, any embodiment/example described herein (or any feature or features of any embodiment/example described herein) may be combined with any other embodiment/example described herein (or any feature or features of any such other embodiment/example described herein).

While a number of embodiments/examples of the present invention have been described, it is understood that these embodiments/examples are illustrative only, and not restrictive, and that many modifications may become apparent to those of ordinary skill in the art. For example, certain methods may be "computer implementable" or "computer implemented." To the extent that such methods are implemented using a computer, not every step must necessarily be implemented using a computer. Further, fiducial marks of various embodiments may be of any desired, hollow shape. Further still, fiducial marks of various embodiments may be particularly useful when more than one type of form may be detected and/or there is a stack of multiple forms (wherein, for example, all of the forms in the stack are not aligned). Further still, user marking cells may be of any desired shape and may be arranged in any desired pattern. Further still, the forms of the present invention may utilize any conventional features (e.g., clocks), as desired. Further still, fiducial marks and/or user marking cells may be printed or otherwise placed on the forms. Further still, the various steps may be carried out in any desired order (and any desired steps may be added and/or any desired steps may be eliminated).

What is claimed is:

1. A method for detecting user marks, comprising:
placing a form in a field of view of a camera, wherein the form includes thereon at least a first fiducial mark and a second fiducial mark, and wherein each of the first fiducial mark and the second fiducial mark has a measurable property that is essentially scale invariant;
utilizing the camera to generate an electronic image of at least a portion of the form;
calculating with a processor mechanism in operative communication with the camera, based at least in part upon the electronic image, a distance between at least the first fiducial mark and the second fiducial mark;
detecting with the processor mechanism at least a first user marking cell on the form, wherein the first user marking cell is bounded by at least one indicium that is visible to the camera, and wherein the first user marking cell is detected based at least in part upon the calculated distance between the first fiducial mark and the second fiducial mark;
calculating with the processor mechanism a displacement vector of the detected first user marking cell versus an ideal planar position of the detected first user marking cell;
detecting with the processor mechanism at least a second user marking cell on the form, wherein the second user marking cell is bounded by at least one indicium that is visible to the camera, and wherein the second user marking cell is detected based at least in part upon the displacement vector of the detected first user marking cell;

determining with the processor mechanism evidence of at least a first user mark in the detected first user marking cell based at least in part upon a degree of brightness similarity between: (a) at least a portion of the electronic image surrounding the indicium bounding the first user marking cell; and (b) at least a portion of the electronic image included inside the indicium bounding the first user marking cell; and determining with the processor mechanism evidence of at least a second user mark in the detected second user marking cell based at least in part upon a degree of brightness similarity between: (a) at least a portion of the electronic image surrounding the indicium bounding the second user marking cell; and (b) at least a portion of the electronic image included inside the indicium bounding the second user marking cell.

* * * * *